US006090863A

United States Patent [19]

De

[11] Patent Number: 6,090,863

[45] Date of Patent: Jul. 18, 2000

[54] BIODEGRADABLE POLYSTYRENE FOAMING PRODUCTS

[75] Inventor: Li Ming De, Shanghai, China

[73] Assignee: Taiwan Avena International, Inc., Taipei, Taiwan

[21] Appl. No.: 09/440,771

[22] Filed: Nov. 16, 1999

[51] Int. Cl.[7] .......... C08J 9/00

[52] U.S. Cl. .......... 521/84.1; 521/88; 524/47

[58] Field of Search .......... 521/84.1, 88; 524/47

[56] References Cited

U.S. PATENT DOCUMENTS

| | | |
|---|---|---|
| 5,496,895 | 3/1996 | Chinnaswamy et al. . |
| 5,880,184 | 3/1999 | Lazarus . |

*Primary Examiner*—Morton Foelak

*Attorney, Agent, or Firm*—Fulbright & Jaworski L.L.P.

[57] ABSTRACT

A biodegradable polystyrene foaming product comprising 35–65 wt. % of polystyrene, 30–50 wt. % of starch, and 5–15 wt. % of cross-linking agent.

4 Claims, No Drawings

BIODEGRADABLE POLYSTYRENE FOAMING PRODUCTS

BACKGROUND OF THE INVENTION

This invention relates to a kind of biodegradable product, and in particular to a biodegradable polystyrene foaming product, particularly to biodegradable polystyrene foam sheet and polystyrene containers made therefrom such as in fast food containers.

Polystyrene sheet and their products (such as lunch boxes, bowls, dishes, etc.) presently supplied in the domestic market are all non-degradable products, and are often discarded to dumps after utilization, only a small part of such products are recovered, regenerated, and treated. Most of the products remain and thus may form a public hazard of "plastic wastes", cause environmental pollution and influence ecological equilibrium.

Biodegradable plastic foaming products are known, the raw materials used involving a starch and some synthetic polymers selected from ethylene vinyl alcohol, ethylene-acrylic acid and their mixtures. These products possess an obdurate structure with a density of 0.1–0.3 g/cm$^3$. Production of such biodegradable foaming products involves an extrusive component of a starch and synthetic polymers selected from ethylene vinyl alcohol and ethylene acrylic acid, and carried out in the presence a foaming agent formed from reaction of a polymeric acid and sodium bicarbonate.

U.S. Pat. No. 5,880,184 describes the extrusion of a starch, such as sago starch, with a water-soluable polymer. In U.S. Pat. No. 5,496,895, a biodegradable plastic material, that can include polystyrene, polyurethane, polyethylene, polypropylene, or polycarbonate, can be prepared with a carbohydrate, such as a starch, and adding a compound to degrade the carbohydrate. Glycerol is among more than fifty diverse carbohydrate-degrading compounds listed.

Since starch-based plastics are accepted by the public, the species of products and the application fields have been increased and expanded gradually, but the Polystyrene sheet and products prepared by starch used as a filler can only be produced by a few producers. Moreover, because of the limitation of production technology and equipment, the mixed amount of starch is less than 10%. At such levels the starch does not have a significant degradable effect. It can only be regarded as a means of lowering the cost of raw material and cannot really attain the aim of popularizing the application of degradable polystyrene material. Besides, in the course of sheet drawing, on account of the incorporation of starch, there are still many shortcomings in the mastering of formulations and technology. Difficulties experienced with grafting of starch with polymer and the appearance of semi-products and products so produced, have prevented the widespread use of starch.

SUMMARY OF THE INVENTION

The aim of this invention Is to supply a kind of biodegradable polystyrene foaming product that will radically solve the nondegrability of present polystyrene products.

The biodegradable polystyrene foaming products of this invention contain 35–65 wt. % of polystyrene, 30–50 wt. % of a starch, and 5–15 wt. % of a cross-linking agent selected from glycerine, saponified glycerine and sorbic alcohol.

The glycerine or sorbic alcohol is used in the present invention as a linking agent and not directly to degrade the starch.

DETAILED DESCRIPTION

Granulation is carried out by passing the above-mentioned raw materials into an extruder, carrying out molding by sheet-drawing, and then carrying out processing to prepare various products, like fast food utensils. In the course of extrusion and granulation, the long radius ratio of the extruder should preferably be greater than 35:1, and the temperature in each section should be automatically control-fed. Because the starch may be carbonized under the temperature of more then 200° C., therefore we take 200° C. as the upper limited of granulation temperature, and the softening point of polystyrene (about 120° C.) as the lower limit. Therefore the temperature shall be controlled between 120–200° C. Meanwhile, a vacuum pump is installed on the top of the mold, suitable to remove the excess moisture so that the material extruded possesses no evident bubbles. The rotating speed of screw is maintained so it is at least 300 rpm to complete the combination of various raw materials. The granulator used is a ZSK-58 type bitruder made by WPC Company. The molding of sheet-drawing and the final die forming is the same as the processing technology of pure polystyrene presently used, and the heating temperature is controlled between 120–200° C.

In comparison with the known biodegradable products, the product of this invention possesses remarkable superiority. First, the raw material starch used is a kind of ordinary grade which possesses the advantage of cheap price and abundance in resources; secondly, and also the most important factor is that this kind of plastic products is properly biodegradable, in that the starch is in a free state of granules present in the synthetic high polymers, the starch granules are attacked by micro-organisms until completely digested, thus weakening the structure of high polymers. In this condition the molecular chain of high polymer will be broken, until it is degraded finally into small chips of polystyrene or granules. This is especially useful in the after treatment of fast food containers. As is well-known, polystyrene is a resin in common use and the disposable fast food products made from polystyrene are safe and economic products which have been accepted by numerous customers. Until the present invention, such products could not effectively be decomposed. Since they are not easily recovered and reused, the pollution created is rather serious. The polystyrene product of this invention can be quickly decomposed in finite time under the influence of micro-organisms, bacterias, and insects. Therefore the present invention solves radically the problem of degrading polystyrene products, opening up a new route for the decomposition, recovery, and reuse of discarded wastes.

This invention will be further described in connection with the following implementing examples where the parts are in weight, but this invention is not limited thereto.

IMPLEMENTING EXAMPLE 1

A mixture of 65 parts of polystyrene, 30 parts of sago starch and 5 parts of sorbic alcohol are extruded by passing through an extruder and granulation is carried out, wherein the temperature is controlled to between 120–200° C. The extruded material is molded by sheet drawing to prepare the product. Each component content, process temperature, and the physical properties of the product are listed in Table 1.

IMPLEMENTING EXAMPLE 2

The process of Example 1 is repeated by using a raw material mixture of 50 parts of polystyrene, 40 parts of sago starch, and 10 parts of saponified glycerine. Each component content, process temperature, and the physical properties of the product are listed in Table 1.

IMPLEMENTING EXAMPLE 3

The process of Example 1 is repeated by using a raw material mixture of 35 parts of polystyrene, 50 parts of sago starch, and 15 parts of cross-linking agent (of which there are 10 parts of glycerine and 5 parts of sorbic alcohol). Each component content, process temperature, and the physical properties of the product are listed in Table 1.

TABLE 1

| Implementing example No. | Component: Polystyrene | Component: Sago starch | Component: Cross-linking agent* | Process temperature | Physical properties: Hori. Strength** Vert. | Physical properties: Thermo-stability | Physical properties: Load (height variation) | Physical properties: Discount properties |
|---|---|---|---|---|---|---|---|---|
| 1 | 65 | 30 | 5 | 120–200 C | 1.14 | No deformation | <5% | 20 times No fracture |
| | | | | | 1.60 | No leakage | | |
| 2 | 50 | 40 | 10 | 120–200 C | 0.80 | No evident deformation | <5% | 10 times No fracture |
| | | | | | 1.00 | No leakage | | |
| 3 | 35 | 50 | 15 | 120–200 C | 0.48 | Slightly deformed | >10% | 3 times fracture |
| | | | | | 0.70 | Slightly leakage out | | |

*The cross-linking agent used in implementing example 1 is sorbic alcohol. The cross-linking agent used in implementing example 2 is glycerine. The cross-linking agent used in implementing example 3 are glycerine + sorbic alcohol.
**The unit of strength is: MPA From Table 1, it is clear that along with the increase of the starch content and the decrease of Polystyrene content, the physical properties of the product will gradually become poorer. Generally, the properties are best in the case of 30–40 parts of starch content.

A surface plate method (laboratory method) and an outdoor, soil burial method (natural abandonment method) to test the biodegradable properties of the products of this invention are used. The test, method and results are described as follows:

1. Surface plate method: According to the technical standard of ASTM G21-90, a surface plate method is used to test the biodegradable properties of the test sample. The test sample is cut into a test block of 3×3 cm. It is placed at the center of surface plate of substrate previously prepared, and a mixed suspension of testing fungus and spore of constant concentration is sprinkled therein (the concentration of spore suspension shall be 10—10 pieces/ml; it is necessary to sprinkle wet the surface of the test sample). The lid is placed on the cover, the assembly placed at suitable humiture (30 degrees C.+I of temperature and more than 95% of relative humidity), and cultivation is carried out in 28 days to observe the breeding condition of the fungi at regular intervals, which is recorded in different grades. The results are listed in Table 2.

2. Soil burial method: The previously prepared test sample of fixed size is buried in the soil. The function of natural soil fungi is used to judge the biodegradable prop erties of the test sample, observed at regular intervals, and recorded in different grades. The results are listed in Table 3.

TABLE 2

Surface plate method

| Serial No. | Name of test sample | The breeding conditions (grade) of hypha. 7 days | 14 days | 21 days | 28 days |
|---|---|---|---|---|---|
| | Fast food lunch-box | 1 | 2 | 3− | 3 |
| | made of | 1 | 2 | 3− | 3 |
| | biodegradable | 1 | 2− | 2+ | 3 |
| | polystyrene. | | | | |

TABLE 3

| Name of test sample | Treatment condition | The breeding conditions (grade) of hypha. 7 days | 14 days | 21 days | 28 days | Remarks |
|---|---|---|---|---|---|---|
| | | Outdoor soil burial method | | | | |
| Fast food lunch-box made of biodegradable polystyrene. | Without any covering on the surface | 1 | 2 | 3− | 3 | |
| | Cover by weeds on the surface. | 2 | 3 | 4− | 4+ | Cracks appeared |
| | Cover by soil of 1–2 cm on the surface. | 2 | 3 | 4− | 4+ | Cracks appeared |
| | Put into waste water trench. | 2 | 2+ | 3− | 3 | |

In the Tables:
Grade 0 No breeding trace
Grade 1 Trace of breeding (<10%)
Grade 2 Mild breeding (10–30%)
Grade 3 Moderate breeding (30–60%)
Grade 4 Mass breeding (60% or covered on whole surface)

From the above Tables 2 & 3, we know that the fast food lunch-box made of biodegradable polystyrene will begin to mildew in seven days, and some breeding trace of hypha will be occurred on the surface. After 28 days, it will seriously be corroded and cracks will even occur; also many places will be swallowed by insects and punched. These conditions indicate that biodegradable polystyrene products possess the evident advantage of a fast initial period of degradation, and will be quickly degradable.

The above content states the characteristics, concrete content, and implementing examples of this invention. It is clear that in this technical field any change or improvement made for this invention all belong to the scope of this invention.

What is claimed is:

1. A biodegradable polystyrene foamable product, comprising:

35–65 wt. % of polystyrene, 30–50 wt. % of starch, and 5–15 wt. % of a cross-linking agent selected from glycerine, saponified glycerine and sorbic alcohol.

2. The biodegradable polystyrene foamable product of claim 1 in which the cross linking agent is saponified glycerine.

3. A polystyrene foamable product prepared from a biodegradable foaming product of claim 1.

4. A polystyrene foamable product prepared from a biodegradable foaming product of claim 3.

* * * * *

UNITED STATES PATENT AND TRADEMARK OFFICE
CERTIFICATE OF CORRECTION

PATENT NO. : 6,090,863

DATED : JULY18, 2000

INVENTOR(S) : Li Ming De

It is certified that error appears in the above-identified patent and that said Letters Patent is hereby corrected as shown below:

| COVER PAGE | DESCRIPTION |
|---|---|
| [73] | Change "Avena" to –Avana-- |

Signed and Sealed this

Eighth Day of May, 2001

*Attest:*

NICHOLAS P. GODICI

*Attesting Officer*

*Acting Director of the United States Patent and Trademark Office*